Dec. 12, 1961      H. C. WARREN      3,012,539
POULTRY FEEDER
Filed July 17, 1959
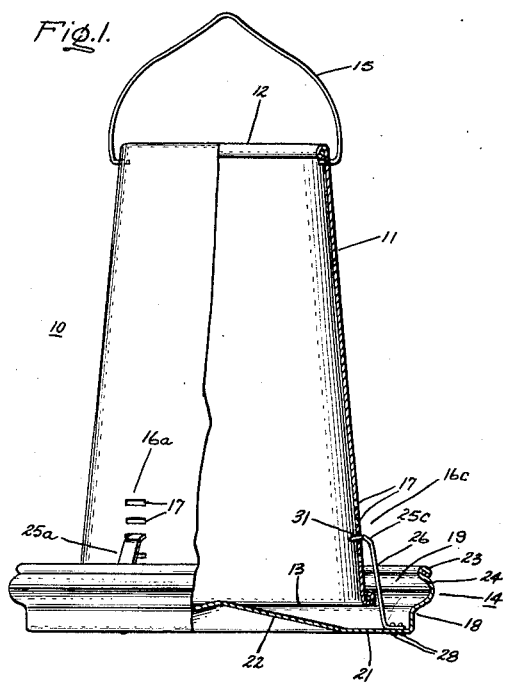
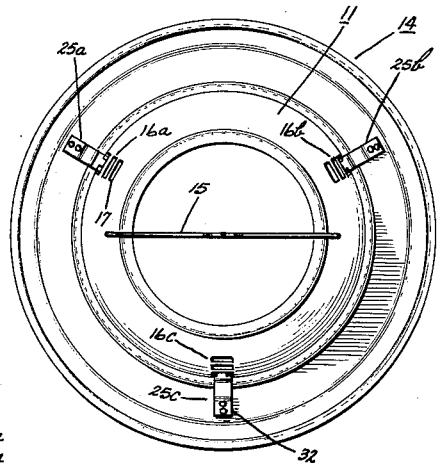
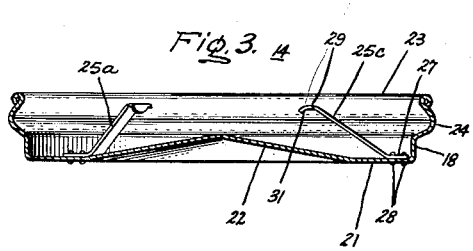
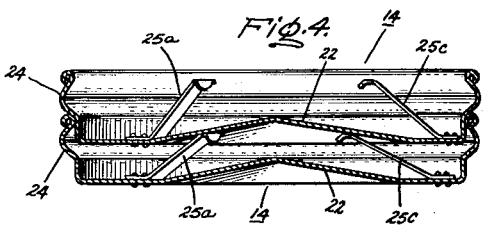
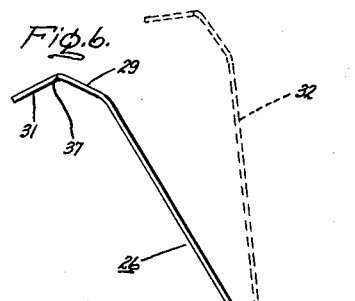
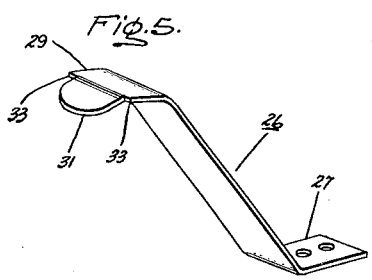
Inventor:
Howard C. Warren,
by Just + Irish
Attorneys.

United States Patent Office 3,012,539
Patented Dec. 12, 1961

3,012,539
POULTRY FEEDER
Howard C. Warren, North Manchester, Ind., assignor to The Warner Brooder Corporation, North Manchester, Ind.
Filed July 17, 1959, Ser. No. 827,796
5 Claims. (Cl. 119—53)

This invention relates generally to poultry feeding devices, and more particularly to a poultry feeder adapted either to be suspended above the floor or to stand upon the floor.

Poultry feeders have been provided in the past comprising a feed supplying hopper element and a feed dispensing pan connected to the lower end thereof. It is desirable in the design of such poultry feeding devices to provide for ready adjustment of the spacing between the pan and the lower end of the hopper element in order to control the amount of feed which is supplied from the hopper element to the pan and numerous arrangements for adjustably securing the pan to the hopper element have been proposed in the past. However, to the best of the present applicant's knowledge, such arrangements have either been unduly complicated and expensive, or have not supported the hopper element with the necessary stability when the feeder was standing on the floor or ground.

It is therefore desirable to provide a poultry feeder construction in which the hopper element is stably and firmly secured to the pan at a selectively adjustable height thereabove, the feeder being equally suitable for use suspended above the floor or ground or standing thereupon, and being further characterized by its extreme simplicity and economy of assembly.

It is accordingly an object of my invention to provide an improved poultry feeder.

Another object of my invention is to provide an improved poultry feeder in which the hopper element is stably and firmly supported on the pan at a selectively adjustable height thereabove.

A further object of my invention is to provide an improved poultry feeder in which the hopper element is stably supported on the pan so that the feeder can be either suspended above the floor or ground or can stand thereon, and which is characterized by its simplicity and economy of construction.

Further objects and advantages of my invention will become apparent by reference to the following description and the accompanying drawing, and the features of novelty which characterize this invention will be pointed out with particularity in the claims annexed to and forming a part hereof.

My invention in its broader aspects provides a poultry feeder comprising a feed supplying hopper element open at its top and bottom ends and having a plurality of sets of slots formed in its wall adjacent the bottom end, the sets of slots being evenly spaced around the periphery of the hopper with each set comprising a plurality of horizontally extending relatively narrow slots in spaced apart vertical alignment. A relatively shallow feed dispensing pan is provided disposed below and spaced from the bottom end of the hopper element, the pan being wider than the hopper element bottom end with its rim surrounding and defining a feeding trough therewith. A plurality of spring lock members are provided evenly spaced around the pan respectively cooperating with the sets of slots for supporting the hopper element at selectively adjustable heights above the bottom of the pan, each of the spring lock members being an elongated, generally upstanding leaf spring element having one end rigidly secured to the pan and its other end inserted in a respective slot in the hopper element.

In the drawing:
FIG. 1 is a side elevational view, partly in cross section, illustrating my improved poultry feeder;
FIG. 2 is a top view of the device of FIG. 1;
FIG. 3 is a cross-sectional view of the pan of the feeder of FIG. 1 prior to assembly of the hopper element thereon;
FIG. 4 is a cross-sectional view showing the stacking of two of the pan elements of my improved poultry feeder;
FIG. 5 is a perspective view of one of the spring lock members of my invention; and
FIG. 6 is a side view of one of the spring lock members of my invention shown in its normal and deflected or flexed positions.

Referring now to the figures of the drawing, my improved poultry feeding device, generally indicated at 10, comprises a generally frusto-conical feed supplying hopper element 11 open at its top and bottom ends 12 and 13 respectively with its bottom end 13 being wider than its top end 12. It will be readily understood that hopper element 11 is filled with feed from the top 12, which in turn is supplied to feed dispensing pan 14 from bottom end 13. A handle or bail 15 is secured to the upper end 12 of hopper element 11 in order to carry the device and also to suspend the same above the floor or ground when that method of feeding is desired.

Three sets of slots 16a, 16b and 16c are provided in the wall of hopper 11 adjacent bottom end 13 equally spaced around the periphery thereof, as best seen in FIG. 2. Each of the sets of slots 16a, 16b, 16c comprises a plurality (four in the illustrated embodiment) of horizontally extending, vertically relatively narrow slots 17 disposed in spaced apart vertical alignment, as shown.

Pan 14 is relatively shallow, being wider than bottom end 13 of hopper element 11 so that its rim 18 surrounds and defines a feeding trough 19 with the bottom end 13 of hopper element 11. The bottom 21 of pan 14 has its center formed as an upwardly extending shallow cone 22 to facilitate the supply of feed from the hopper element 11 into the trough 19. It will be observed that the top edge 23 of pan 14 is wider than bottom 21 and that an outwardly extending bulge 24 is formed in rim 21 to permit a plurality of pans to be nested, as best seen in FIG. 4.

In order firmly and stably to support hopper element 11 with its bottom end 13 at a selectively adjustable height above bottom 21 of pan 14, three spring lock members 25a, 25b and 25c are provided evenly spaced around pan 14. It will be seen that each of the spring lock members 25a, 25b, 25c is formed as a flat, generally upstanding, elongated leaf spring 26 having its lower or outer end 27 rigidly secured to the bottom 21 of pan 14 adjacent rim 18 in any suitable manner, as by suitable rivets 28. Each of the leaf spring members 26 has its upper end 29 curved slightly downwardly, as shown, terminating in a tab 31 which is inclined further downwardly defining generally a right angle with leaf spring 26, as best seen in FIG. 6. It will further be seen that the leaf springs 26 are slightly wider than slots 17 in hopper element 11 with the tabs 31, however, being slightly narrower than slots 17.

Referring specifically to FIG. 3, it will be seen that prior to assembly of hopper element 11 onto the pan 14, leaf springs 26 of spring lock members 25a, 25b, 25c have a first, normal, unflexed position inclined at an angle to bottom 21 with their inner ends 29 being disposed below the top edge 23 of pan 14 and defining a circle smaller in diameter than the diameter of bottom end 13 of hopper element 11. This permits a plurality of pans 14 to be nested for shipment, as shown in FIG. 4, the spring lock members 25a, 25b, 25c of each pan being disposed within and engaging the inner surface of the conical portion 22 of the bottom 21 of the next higher pan, as shown.

In order to attach hopper element 11 to the pan 14, leaf spring members 26 are flexed upwardly and outwardly, as shown in dashed lines 32 in FIG. 6 so as to receive the lower end 13 of hopper element 11, the tab portions 31 being respectively inserted in the selected slots 17, as best seen in FIG. 1.

It will be readily seen that the portions 33 of ends 29 of leaf spring members 26 on either side of tabs 31 engage the outer surface of hopper element 11 on either side of the respective slot 17 and thus, since the leaf spring members 26 have been deflected or flexed upwardly and outwardly, substantial inward force or thrust is equally exerted by the leaf spring members 26 on the hopper element 11 thereby firmly and stably supporting and positioning the hopper element 11 concentric with pan 14 so that bottom end 13 is at the desired height above bottom 21 of pan 14 according to the slots 17 selected.

It will now be readily seen that when the feeder 10 is to be suspended above the floor or ground by means of bail 15, spring lock members 25a, 25b, 25c serve as links to suspend pan 14 the desired distance below the lower end 13 of hopper element 11 and additionally, that by virtue of the fact that the leaf spring members 26 are in their deflected or flexed positions, pan 14 is firmly and stably secured to hopper element 11 and accurately centered with respect thereto. On the other hand, if it is desired to stand the feeder 10 on the floor or ground, it will be observed that hopper element 11 is firmly and stably supported from pan 14, again by virtue of the force exerted by the leaf spring members 26 which centers hopper element 11 with respect to pan 14 and firmly and stably supports the same therefrom at the desired height with respect thereto. It will be seen that my improved poultry feeder is characterized by its extreme simplicity and economy of manufacture, the construction further lending itself to ready nesting of the pan and hopper elements for economy of shipment. It further will be seen that in my improved feeder construction, the hopper element is very readily and quickly secured to the pan at the desired height and can be removed therefrom or its height adjustment changed with equal facility.

While I have illustrated and described a specific embodiment of my invention, further modifications and improvements will occur to those skilled in the art and I desire therefore in the appended claims to cover all modifications which do not depart from the spirit and scope of my invention.

What is claimed is:

1. A poultry feeder comprising a pan-like feed receiver, a supply hopper having a lower open end contained within said receiver, said hopper having spaced openings circumferentially thereof and spaced from said open lower end, and spring elements rigidly secured to said receiver circumferentially thereof and having upwardly extending terminals, each of said terminals being supportingly received in one of said openings.

2. The combination of claim 1 wherein each of said spring elements is an elongated flat leaf spring which is preformed resiliently to apply raidally inward force on said supply hopper.

3. The combination of claim 1 wherein a plurality of sets of said openings are provided, each set comprising a plurality of vertically spaced openings.

4. The combination of claim 1 wherein each of said spring elements is an elongated flat leaf spring which is preformed resiliently to apply radially inward force on said supply hopper, and wherein a plurality of sets of said openings are provided, each set comprising a plurality of vertically spaced horizontally extending slots.

5. The combination of claim 1 wherein each of said spring elements is an elongated flat leaf spring which is preformed resiliently to apply radially inward force on said supply hopper, each of said terminals comprising a tab portion formed at the end of the respective spring element, each tab portion being narrower than the remaining portion of the respective spring element, said remaining portion being wider than the respective opening.

References Cited in the file of this patent

UNITED STATES PATENTS

| | | |
|---|---|---|
| 958,630 | Grant | May 17, 1910 |
| 1,106,547 | Crabill | Aug. 11, 1914 |
| 1,114,482 | Johnson | Oct. 20, 1914 |
| 1,131,491 | Drake | Mar. 9, 1915 |
| 1,149,477 | Thompson | Aug. 10, 1915 |
| 1,180,649 | Hurd | Apr. 25, 1916 |
| 1,469,340 | Shortell | Oct. 2, 1923 |
| 1,610,614 | McCollough | Dec. 14, 1926 |
| 2,808,028 | Landgraf | Oct. 1, 1957 |